US012212946B2

(12) United States Patent
Jin et al.

(10) Patent No.: US 12,212,946 B2
(45) Date of Patent: Jan. 28, 2025

(54) FULL-FREQUENCY BAND HIGH QUALITY SPEAKER WITH A BAR AND SOUND TUNNELS

(71) Applicant: SUZHOU LI YUE MUSICAL INSTRUMENTS CO., LTD., Jiangsu (CN)

(72) Inventors: Haiou Jin, Suzhou (CN); Nianbo Wu, Suzhou (CN); Xinxi He, Suzhou (CN); Xinzhi Zhu, Suzhou (CN); Biying Li, Suzhou (CN); Ping Yang, Suzhou (CN)

(73) Assignee: SUZHOU LI YUE MUSICAL INSTRUMENTS CO., LTD., Suzhou (CN)

( * ) Notice: Subject to any disclaimer, the term of this patent is extended or adjusted under 35 U.S.C. 154(b) by 126 days.

(21) Appl. No.: 18/026,042

(22) PCT Filed: Dec. 15, 2020

(86) PCT No.: PCT/CN2020/136579
§ 371 (c)(1),
(2) Date: Mar. 13, 2023

(87) PCT Pub. No.: WO2022/036956
PCT Pub. Date: Feb. 24, 2022

(65) Prior Publication Data

US 2024/0137705 A1 Apr. 25, 2024
US 2024/0236576 A9 Jul. 11, 2024

(30) Foreign Application Priority Data

Aug. 19, 2020 (CN) ........................ 202010838144.X

(51) Int. Cl.
*H04R 7/14* (2006.01)
*H04R 1/24* (2006.01)
(Continued)

(52) U.S. Cl.
CPC ................. *H04R 7/14* (2013.01); *H04R 1/24* (2013.01); *H04R 7/18* (2013.01); *H04R 9/025* (2013.01); *H04R 9/041* (2013.01)

(58) Field of Classification Search
CPC ... H04R 7/14; H04R 7/18; H04R 1/24; H04R 9/025; H04R 9/041
See application file for complete search history.

(56) References Cited

U.S. PATENT DOCUMENTS

2019/0289401 A1 9/2019 Fujitani

FOREIGN PATENT DOCUMENTS

CN 204616039 U 9/2015
CN 209046870 U 6/2019
(Continued)

OTHER PUBLICATIONS

May 18, 2021 Search Report issued in International Patent Application No. PCT/CN2020/136579.

*Primary Examiner* — Sunita Joshi
(74) *Attorney, Agent, or Firm* — Oliff PLC

(57) ABSTRACT

A full-frequency band high quality speaker with a bar and sound tunnels includes a voice coil, magnet, diaphragm and magnetically conductive structure; the diaphragm is conical, a bridge-style bar is on the surface of at least one side of the diaphragm; the diaphragm includes at least two grooves, each horizontally radial; each groove crosses the bridge-type bar in the horizontal direction and the length direction of the groove is perpendicular to the bridge-type bar; the groove is concave on the surface of the diaphragm to form a sound tunnel. The diaphragm is changed to the current standard vibration mode, and the timbre of treble register is not bright and the timbre of bass register is not sonorous and mellow enough from the perspective of vibration, resonance and phonation. The practice proves that the improved scheme has outstanding substantive characteristics and remarkable
(Continued)

technical progress, and has obtained obvious technical results.

6 Claims, 7 Drawing Sheets

(51) Int. Cl.

| | |
|---|---|
| ***H04R 7/18*** | (2006.01) |
| ***H04R 9/02*** | (2006.01) |
| ***H04R 9/04*** | (2006.01) |

(56) References Cited

FOREIGN PATENT DOCUMENTS

| | | | | |
|---|---|---|---|---|
| CN | 209693035 | U | * | 11/2019 |
| CN | 111954133 | A | | 11/2020 |
| WO | 2015/155552 | A1 | | 10/2015 |

* cited by examiner

FULL-FREQUENCY BAND HIGH QUALITY SPEAKER WITH A BAR AND SOUND TUNNELS

TECHNICAL FIELD

The invention relates to a speaker, in particular to a full-frequency band high quality speaker with a bar and sound tunnels.

BACKGROUND TECHNOLOGY

Speakers (also known as loudspeakers) are a device that converts electrical signals into acoustic signals. As shown in FIG. 1, traditional speakers are usually composed of voice coil 1, magnet 2, magnetically conductive plate 3, Yoke 4, diaphragm 5 (i.e. cone paper) and other structures. When the speaker is working, the current of different sizes output by the amplifier is converted into sound waves through frequency waves, and its output energy is increased through the promotion of power. The voice coil 1 moves under the action of magnetic field. At the same time, the voice coil 1 is connected to the diaphragm 5 and drives the diaphragm 5 to vibrate, and then the vibration of the diaphragm 5 pushes the air to produce sound.

The common problem of traditional speakers is: The speaker has an inherent resonance frequency when it sounds. Beyond a certain range of the resonance frequency, the timbre of treble register is not bright enough, and the timbre of bass register is not mellow enough. The bass must be achieved by a special woofer, and the treble must be achieved by a special tweeter. In other words, the quality of timbre is proportional to the number of speakers. The high-quality timbre of the full frequency band cannot be achieved through a single speaker. The main reason is that the current speaker diaphragm can't complete a good broadband vibration between treble and bass register. That is to say, it can't simultaneously adapt to the resonance and vibration with wide-frequency changes of the treble, alto and bass register. The traditional speaker with unreasonable structure design is not conducive to the sound wave vibration of the diaphragm from treble register to bass register. In order to achieve the sound quality performance of the appreciation level, it is necessary to combine a number of different frequency band speakers, that is, through the combined speaker to achieve. However, this would usually be expensive and not conducive to broadening the market. In addition, the larger volume of combined speaker requires more space for placement.

Therefore, how to solve the shortcomings of the above existing technologies has become the subject to be studied and solved by the invention.

SUMMARY OF THE INVENTION

The purpose of the invention is to provide a full-frequency band high quality speaker with a bar and sound tunnels.

To achieve the above purpose, the technical scheme adopted by the invention is:

A full-frequency band high quality speaker with a bar and sound tunnels comprises a voice coil, a magnet, a diaphragm and magnetically conductive structure; the diaphragm is conical, of which upper end is outwardly expanded open shape and lower end is internally shrunk corresponding to the voice coil;

a bridge-style bar is provided on the surface of at least one side of the diaphragm; the bridge-style bar is annular and has a distance from a dust cover of the voice coil in the horizontal direction of the speaker;

the diaphragm is provided with at least two grooves on the same surface where the bridge-type bar is provided, and each groove is radially arranged according to the center of the diaphragm in the horizontal direction, so as to divide the surface of the diaphragm on the outside of the bridge-type bar into several resonance regions; Each groove crosses the bridge-type bar in the horizontal direction and the length direction of the groove is perpendicular to the bridge-type bar; the grooves are concave on the surface of the diaphragm to form sound tunnels.

Relevant contents of the above technical scheme are explained as follows:

1. In the above scheme, the magnetic structure can include a magnetically conductive plate, a Yoke and other components. Since the magnetically conductive structure is not the innovation point of this invention, which belongs to the prior art that can be mastered by those skilled in the art, it is not described in this invention.
2. In the above scheme, the bridge-style bar has a distance from a dust cover in the horizontal direction of the speaker. With this design, the sound vibration of the voice coil will be collected here.
3. In the above scheme, each groove is uniformly radially arranged according to the center of the diaphragm in the horizontal direction. It helps to transmit the vibration of the voice coil to the surrounding of the diaphragm rapidly through the radial sound tunnels (the tunnels of sound) formed by the grooves.
4. In the above scheme, the diaphragm is divided into a treble region in the upper section, an alto region in the middle section and a bass region in the lower section according to sound frequency band; the wall thickness of the diaphragm gradually increases from the outer edge to the inside, so that the wall thickness of the bass region is greater than that of the alto region, and the wall thickness of the alto region is greater than that of the treble region; the bridge-type bar is located in the bass region.

In this design, the thicker bass region is set close to the position of the voice coil, which can make the low frequency vibration with lower frequency and larger amplitude send out more sonorous and mellow bass in the bass region of the diaphragm; By setting the thinner treble region far away from the voice coil, the high frequency vibration with higher frequency and smaller amplitude emit a more clear and bright treble in the treble region of the diaphragm, so that the timbre and sound quality of the speaker in the full frequency band are effectively improved.

5. In the above scheme, the bottom of the bridge-type bar is provided with a bridge opening; the bridge opening is arranged through the width direction of the bridge-type bar, and the lower opening of the bridge opening corresponds to the groove.

In this design, the bar is located on the sound tunnel, which is more conducive to the transmission of vibration through the sound tunnel, so as to improve the vibration response rate of the diaphragm.

6. In the above scheme, when the diaphragm is horizontal, the center line of the upper and lower directions of the bridge-type bar overlaps the center line of the upper and lower directions of the diaphragm to improve the sound quality and timbre.

7. In the above scheme, each groove is an arc groove, which are capable of reduce the sudden change of thickness of the diaphragm as far as possible in the thickness and avoid affecting the resonance and vibration of the diaphragm.
8. In the above scheme, a smooth transition surface is arranged between the outer end of the groove and the surface of the diaphragm.

The working principle and advantages of the invention are as follows:

The invention discloses a full-frequency band high quality speaker with a bar and sound tunnels, which is characterized in that: It comprises a voice coil, a magnet, a diaphragm and magnetically conductive structure; the diaphragm is conical, of which upper end is outwardly expanded open shape and lower end is internally shrunk corresponding to the voice coil; a bridge-style bar is provided on the surface of at least one side of the diaphragm; the bridge-style bar is annular and has a distance from a dust cover of the voice coil in the horizontal direction of the speaker; the diaphragm is provided with at least two grooves on the same surface where the bridge-type bar is provided, and each groove is radially arranged, so as to divide the surface of the diaphragm on the outside of the bridge-type bar into several resonance regions; Each groove crosses the bridge-type bar in the horizontal direction and the length direction of the groove is perpendicular to the bridge-type bar. The grooves are concave on the surface of the diaphragm to form sound tunnels.

Compared with the prior art, the present invention improves the previous speaker, especially the diaphragm design in the speaker, in order to solve the problem that the previous speaker is unable to take into account the treble, alto and bass registers and have good resonance timbre at the same time. It is embodied in the following aspects: first, a bridge-type bar is set up on the surface of the diaphragm; Second, the grooves are radially arranged on the surface of the diaphragm, and the radial grooves form radial sound tunnels on the surface of the diaphragm.

Aiming at the problem that the timbre of treble register of the previous speaker is not bright and the timbre of bass register is not sonorous and mellow enough, the structure and sound mechanism of the speaker are deeply discussed and studied, and the main reason for the poor timbre of treble register and bass register of the previous speaker is found out that the structure of the diaphragm is unreasonable. Therefore, the inventor breaks the shackles of the previous speaker composition design, and boldly proposes an improved scheme of the invention. This improved scheme changes the diaphragm from the previous free vibration mode to the current standard vibration mode, and solves the problem that the timbre of treble register of the previous speaker is not bright and the timbre of bass register is not sonorous and mellow enough from the perspective of vibration, resonance and phonation. The practice proves that the improved scheme has outstanding substantive characteristics and remarkable technical progress, and has obtained obvious technical results.

Due to the application of the above technical scheme, the invention has the following advantages and effects compared with the previous speaker diaphragm:

1. The invention provides a bridge-style bar on the surface of the diaphragm. Because the bass has larger amplitude and lower frequency than the treble, the bass resonance is concentrated in the central region of the diaphragm close to the voice coil, and the treble resonance is concentrated in the peripheral edge region of the diaphragm, strengthening the intensity of the central region of the diaphragm and playing an important role in improving the timbre and sound quality of the bass region. Because the thickness of the diaphragm is thick in the central region and thin around, which is a the gradient structure (i.e. thin on the top and thick on the bottom), the strength of the central region of the diaphragm is enhanced, and the thickness difference between the central region of the diaphragm and the surrounding edge region is also changed, which can also play a beneficial role in improving the timbre and sound quality of the treble register.
2. Radial grooves are provided on the surface of the diaphragm, and the radial grooves actually form radial sound tunnels on the diaphragm, and the area close to the voice coil collects the vibration of the voice coil, and then transmits rapidly to the surrounding edge of the diaphragm through the radial sound tunnel (namely, the tunnel of sound), which plays a key role in improving the timbre and sound quality of the treble register.
3. The bar is designed as a bridge-style bar; especially one side of the bar is designed with a bridge opening (breach), so that the bar is more like a bridge arch structure. When the bar is located on the sound tunnel, it is more conducive to the transmission of vibration through the sound tunnel, so as to be more conducive to the resonance and rapid vibration response of the diaphragm.
4. Through the design of a bridge bar and radial grooves, N resonance areas with the same number of grooves are separated in the diaphragm. When the speaker works, the vibration of the voice coil is first transmitted to the central region of the diaphragm, and then transmitted to the resonance region through the sound tunnel, and produces resonance and vibration, in order to amplify the vibration of the external sound source into the resonance sound of the diaphragm. Each resonance region will produce one sound wave, plus one original sound wave, a total of N+1 sound wave. The amount of sound wave is the number of sound waves, which directly affects the timbre, penetration and volume of the diaphragm. Therefore, the design of the invention significantly improves the timbre of the treble and bass registers and increase the penetration and volume of the treble and bass registers.
5. The bridge-type bar and grooves of the invention may be arranged on the upper surface of the diaphragm, or on the lower surface of the diaphragm, and also be arranged on the upper and lower surfaces of the diaphragm respectively at the same time.

Figure 1:
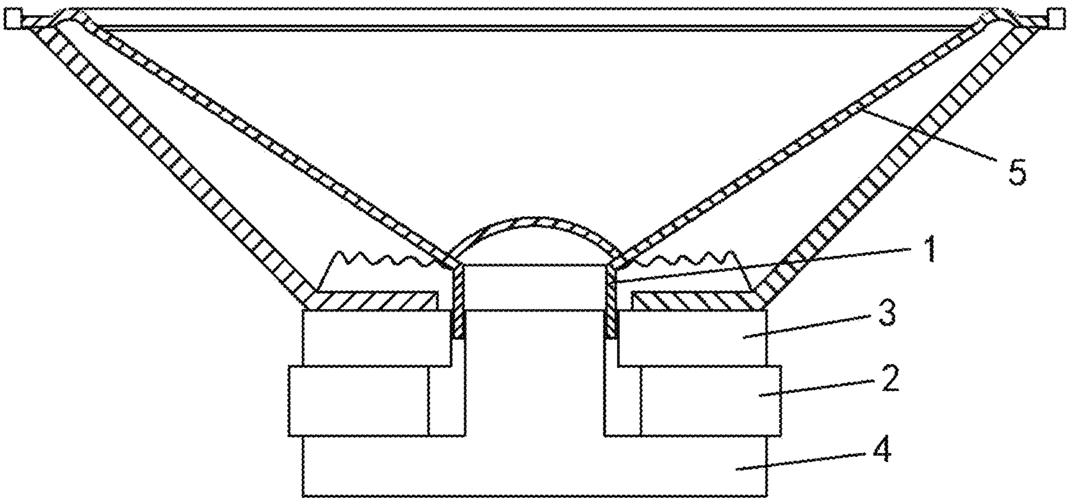
Fig.1 PRIOR ART
FIG. 1 is the structure diagram of the traditional speaker.

In the above figures: 1. voice coil; 2. magnet; 3. magnetically conductive plate; 4. Yoke; 5. diaphragm; 6. diaphragm; 6*a*. treble region; 6*b*. alto region; 6*c*. bass region; 7. bridge-style bar; 8. dust cover; 9. groove; 10. resonance region; 11. bridge opening.

Specific Implementation

The invention is further described in combination with the attached figures and embodiments below:

Embodiment: The present invention will be clearly explained by the following schematics and detailed descriptions. Any person skilled in the field, after learning the embodiments of the present invention, may change and modify them by the techniques taught by the present invention, which is not out of the spirit and scope of the present invention.

As used in this article, "connection" or "set up" may refer to the direct physical contact between two or more components or devices, or to the indirect physical contact between two or more components or devices, or to the interoperation or action of two or more components or devices.

The terms "comprise", "including", "provided", and etc. used in this article are all open terms, which means including but not limited to.

The terms used in this article, unless otherwise specified, usually have the common meaning of each word used in this field, in the content of this case and in the special content. Some words used to describe the invention will be discussed below or elsewhere in this specification to provide additional guidance for those skilled in the art on the description of the case.

The words "upper" and "lower" used in this article are directional words. In this invention, they are only used to describe the position relationship between the structures, not to define the specific direction of the protection scheme and actual implementation of the invention.

Refer to the attached FIGS. 2-7, a full-frequency band high quality speaker with a bar and sound tunnels comprises a voice coil 1, a magnet 2, a diaphragm 6 and magnetically conductive structure; The magnetically conductive structure can be composed of a magnetically conductive plate 3 and a Yoke 4. The diaphragm 6 is conical, of which upper end is outwardly expanded open shape and lower end is internally shrunk corresponding to the voice coil 1.

A bridge-style bar 7 is provided on the diaphragm 6; the bridge-style bar 7 is annular and set on the bottom of the upper surface of diaphragm 6, which has a distance from a dust cover 8 of the voice coil 1 in the horizontal direction of the speaker;

Preferred, the diaphragm 6 is divided into a treble region 6*a* in the upper section, an alto region 6*b* in the middle section and a bass region 6*c* in the lower section according to sound frequency band; the wall thickness of the diaphragm gradually increases from the outer edge to the inside (from top to bottom in FIG. 2), so that the wall thickness of the bass region 6*c* is greater than that of the alto region 6*b*, and the wall thickness of the alto region 6*b* is greater than that of the treble region 6*a*; the bridge-type bar 7 is located in the bass region 6*c*, increasing the load on the middle part of diaphragm 6.

By setting the bridge-type bar 7 on the upper surface of the diaphragm 6, because the bass has a larger amplitude and lower frequency than the treble, the bass resonance is concentrated in the central region of the diaphragm 6 close to the voice coil 1, and the treble resonance is concentrated in the peripheral edge region of the diaphragm 6, strengthening the intensity of the central region of the diaphragm 6, which plays an important role in improving the timbre and sound quality of the bass region 6*c*. Because the thickness of diaphragm 6 is the gradual structure of thickness in the central region and thin around (i.e. a design of thin on top and thick on the bottom), the strength of the central region of the diaphragm is enhanced, the thickness difference between the central region of the diaphragm 6 and the surrounding edge region is also changed, which also play a beneficial role in improving the timbre and sound quality of the treble register.

The upper surface of the diaphragm 6 is provided with at least two grooves 9, and the grooves 9 is uniformly distributed radially to the center of the horizontal direction of the diaphragm 6 as a reference, and then divide the surface of the diaphragm 6 on the outside of the bridge-type bar 7 into several resonance regions 10; Each groove 9 crosses the bridge-type bar 7 in the horizontal direction and the length direction of the groove 9 is perpendicular to the bridge-type bar 7.

The grooves 9 are concave on the surface of the diaphragm 6 to form sound tunnels.

Radial grooves 9 are provided on the upper surface of the diaphragm 6, and the radial grooves 9 actually form radial sound tunnels on the diaphragm, and the area close to the voice coil 1 collects the vibration of the voice coil 1, and then transmits rapidly to the surrounding edge of the diaphragm 6 through the radial sound tunnel (namely, the tunnel of sound), which plays a key role in improving the timbre and sound quality of the treble register.

The bottom of bridge-type bar 7 is provided with a bridge opening 11; the bridge opening 11 is arranged through the width direction of the bridge-type bar 7, and the lower opening of the bridge opening 11 corresponds to the groove 9.

The bar is designed as a bridge-style bar 7, especially one side of the bar is designed with a bridge opening (breach) 11, so that the bar is like a bridge arch structure. When the bridge-style bar 7 is located on the sound tunnel, it is more conducive to the transmission of vibration through the sound tunnel, so as to be more conducive to the resonance and rapid vibration response of the diaphragm 6.

Preferred, when the diaphragm 6 is horizontal, the center line of the upper and lower directions of the bridge-type bar 7 overlaps the center line of the upper and lower directions of the diaphragm 6.

Each groove 9 is an arc groove, which are capable of reduce the sudden change of thickness of the diaphragm 6 as far as possible in the thickness and avoid affecting the resonance and vibration of the diaphragm 6. A smooth transition surface is arranged between the outer end of the groove 9 and the surface of the diaphragm 6, so that the vibration is more evenly transmitted to the peripherals of diaphragm 6.

Other implementations and structural changes of the invention are described as follows:

1. In the above embodiment, the speaker shown in the figures is only for illustration purposes, and its structure is not used to limit the protection scope of the invention. Other speakers of similar structure that adopt the technical characteristics of the invention shall be covered by the protection scope of the invention.
2. In the above embodiment, the bridge opening 11 is provided on the bridge-type bar 7, but the invention is not limited to this. Bridge opening 11 may not be provided, or other structures similar to bridge opening 11 may be provided to facilitate vibration transmission through sound tunnel, which is easy to be understood and accepted by those skilled in this field.

Figure 2:
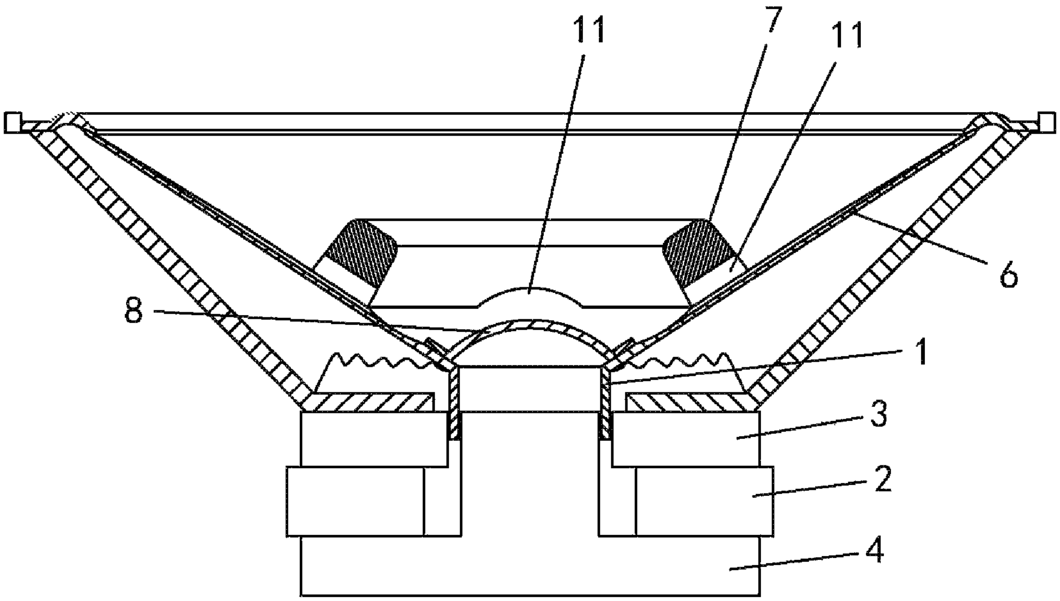
FIG. 2 is a schematic diagram of the overall structure of the embodiment of the invention.
Figure 3:
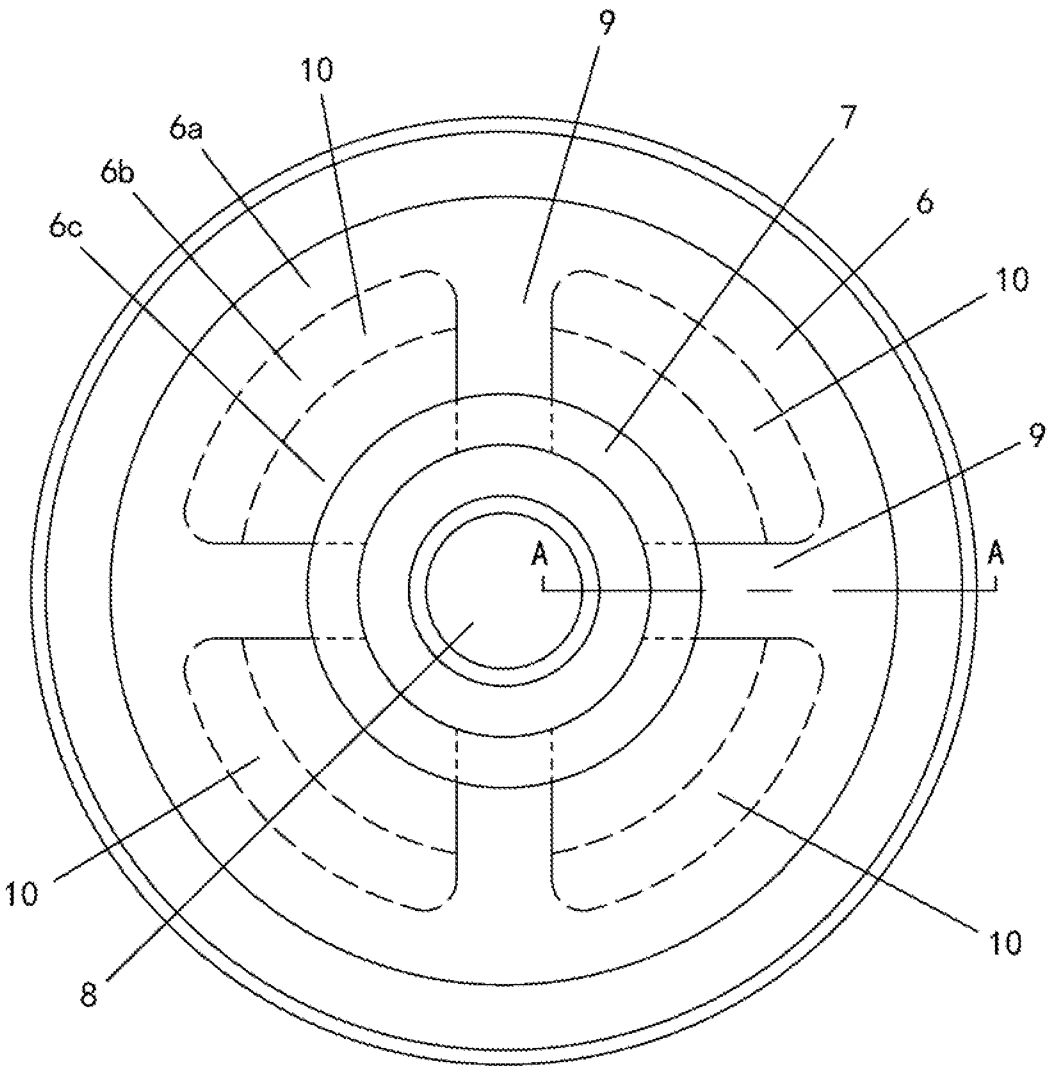
FIG. 3 is an overhead view diagram of the diaphragm in the embodiment of the invention.
Figure 4:
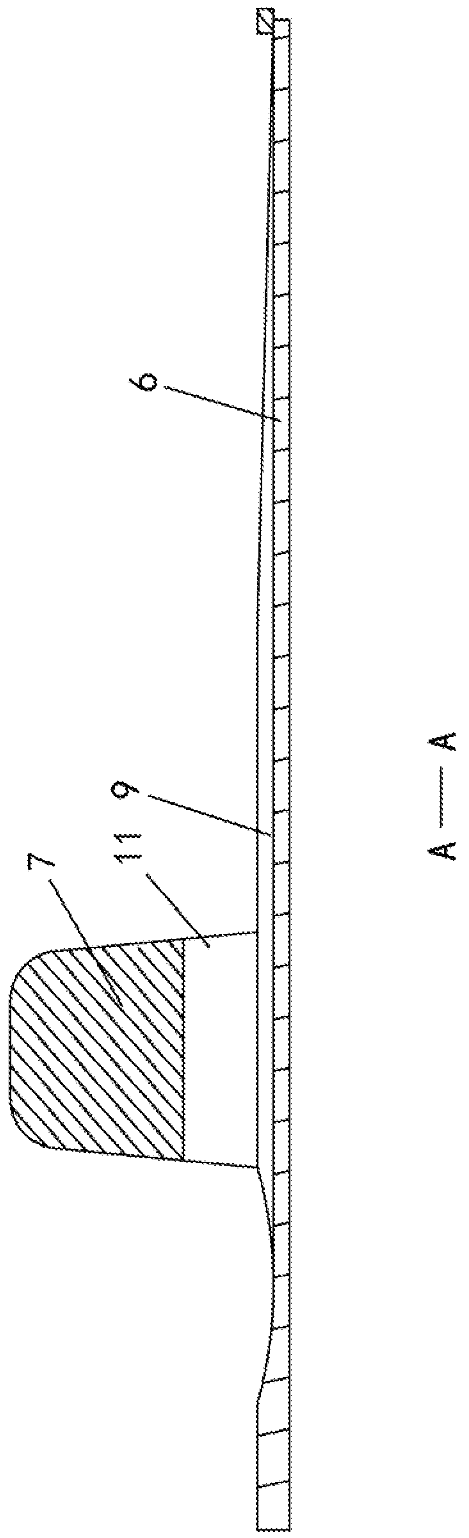
FIG. 4 is the A-A profile in FIG. 3.
Figure 5:
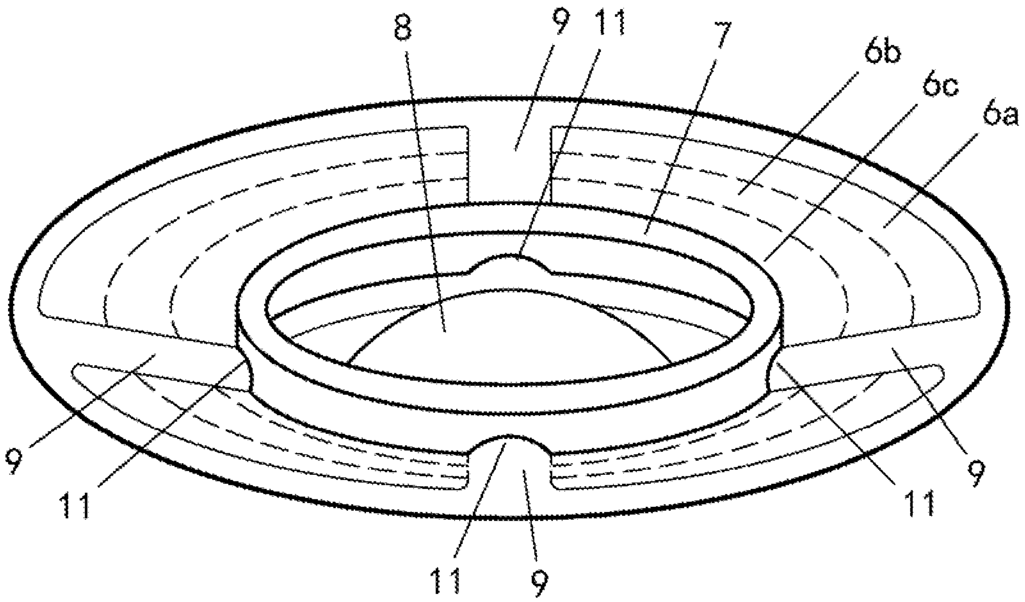
FIG. 5 is a stereogram of the diaphragm in the embodiment of the invention.
Figure 6:
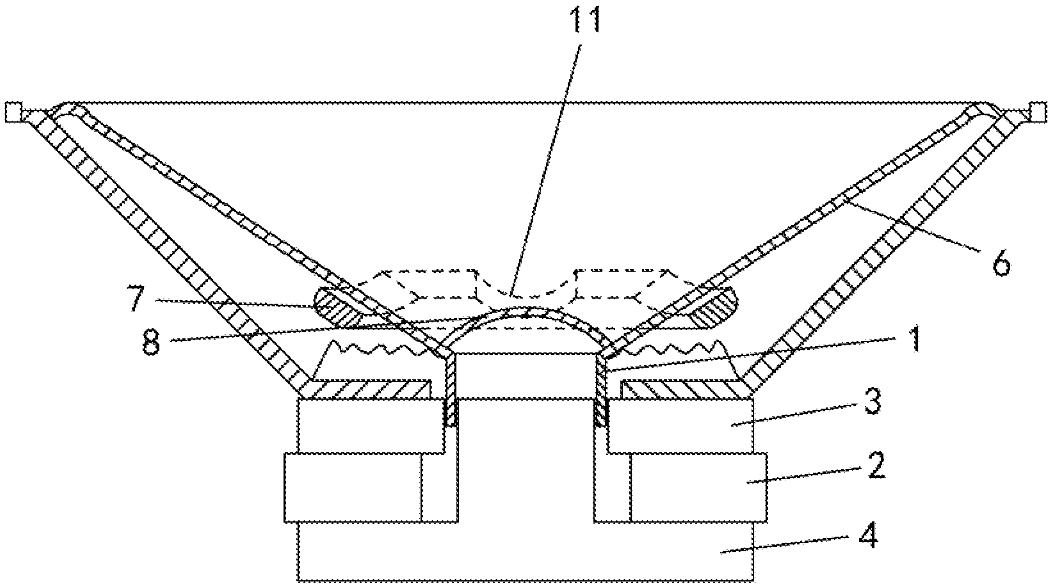
FIG. 6 is a schematic diagram of the embodiment of the invention when the bridge-style bar is arranged on the lower surface of the diaphragm.
Figure 7:
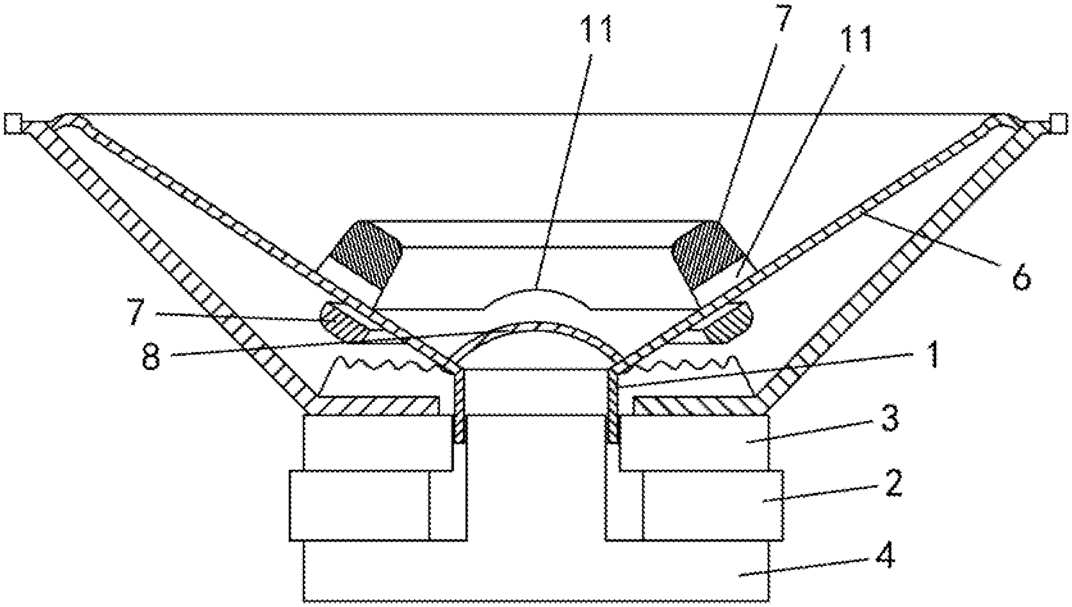
FIG. 7 is a schematic diagram of the embodiment of the invention when the bridge-style bars are respectively arranged on the upper and lower surfaces of the diaphragm at the same time.

3. In the above embodiment, the number of the bridge-type bar 7 is not limited to one, but may also be multiple in parallel or other designs that help to strengthen the load in the middle of diaphragm 6, which is easily understood and accepted by those skilled in the field.
4. In the above embodiment, the bridge-type bar 7 and the grooves 9 may be located on the upper surface of the diaphragm 6 (as shown in FIG. 2), or on the lower surface of the diaphragm 6 (as shown in FIG. 6), or simultaneously on the upper and lower surfaces of the diaphragm 6 (as shown in FIG. 7).
5. In the above embodiment, the grooves 9 are arc grooves. But the invention is not limited to this; the groove may be designed into other shapes, such as V shape, U shape, W shape, and other concave structure. This is easily understood and accepted by those skilled in the field.
6. In the above embodiment, the material of the diaphragm 6 is not limited to the paper, but can also be other materials, such as metal, carbon fiber, etc.

Compared with the prior art, the present invention improves the previous speaker, especially the diaphragm design in the speaker, in order to solve the problem that the previous speaker is unable to take into account the treble, alto and bass registers and have good resonance timbre at the same time. It is embodied in the following aspects: first, a bridge-type bar is set up on the surface of the diaphragm; second, the grooves are radially arranged on the surface of the diaphragm, and the radial grooves form radial sound tunnels on the surface of the diaphragm.

Aiming at the problem that the timbre of treble register of the previous speaker is not bright and the timbre of bass register is not sonorous and mellow enough, the structure and sound mechanism of the speaker are deeply discussed and studied, and the main reason for the poor timbre of treble register and bass register of the previous speaker is found out that the structure of the diaphragm is unreasonable. Therefore, the inventor breaks the shackles of the previous speaker composition design, and boldly proposes an improved scheme of the invention. This improved scheme changes the diaphragm from the previous free vibration mode to the current standard vibration mode, and solves the problem that the timbre of treble register of the previous speaker is not bright and the timbre of bass register is not sonorous and mellow enough from the perspective of vibration, resonance and phonation, improving the fidelity of sound in each frequency band. The practice proves that the improved scheme has outstanding substantive characteristics and remarkable technical progress, and has obtained obvious technical results.

The above embodiments are only intended to illustrate the technical conception and characteristics of the invention, and enable persons familiar with the technology to understand the content of the invention and implement it accordingly, but don't limit the scope of protection of the invention. Any equivalent variation or modification made in accordance with the spirit substance of the invention shall be covered by the protection of the invention.

The invention claimed is:

1. A full-frequency band high quality speaker with a bar and sound tunnels, wherein:

it comprises a voice coil, a magnet, a diaphragm and magnetically conductive structure; the diaphragm is conical, of which upper end is outwardly expanded open shape and lower end is internally shrunk corresponding to the voice coil;

a bridge-style bar is provided on the surface of at least one side of the diaphragm; the bridge-style bar is annular and has a distance from a dust cover of the voice coil in the horizontal direction of the speaker;

the diaphragm is provided with at least two grooves on the same surface where the bridge-type bar is provided, and each groove is radially arranged according to the center of the diaphragm in the horizontal direction, so as to divide the surface of the diaphragm on the outside of the bridge-type bar into several resonance regions;

each groove crosses the bridge-type bar in the horizontal direction and the length direction of the groove is perpendicular to the bridge-type bar;

wherein, the grooves are concave on the surface of the diaphragm to form sound tunnels.

2. The full-frequency band high quality speaker according to claim 1, wherein:

the diaphragm is divided into a treble region in the upper section, an alto region in the middle section and a bass region in the lower section according to sound frequency band;

wherein, the wall thickness of the diaphragm gradually increases from the outer edge to the inside, so that the wall thickness of the bass region is greater than that of the alto region, and the wall thickness of the alto region is greater than that of the treble region;

the bridge-type bar is located in the bass region.

3. The full-frequency band high quality speaker according to claim 1, wherein:

the bottom of the bridge-type bar is provided with a bridge opening; the bridge opening is arranged through the width direction of the bridge-type bar, and the lower opening of the bridge opening corresponds to the groove.

4. The full-frequency band high quality speaker according to claim 1, wherein:

when the diaphragm is horizontal, the center line of the upper and lower directions of the bridge-type bar overlaps the center line of the upper and lower directions of the diaphragm.

5. The full-frequency band high quality speaker according to claim 1, wherein:

each groove is an arc groove.

6. The full-frequency band high quality speaker according to claim 1, wherein:

a smooth transition surface is arranged between the outer end of the groove and the surface of the diaphragm.

* * * * *